350-6.6 SR

XR 3,632,868

[redacted]

TX 3030 D

[11] 3,632,868

[72] Inve

[21] Appl. No. 806,973
[22] Filed Mar. 13, 1969
[45] Patented Jan. 4, 1972
[73] Assignee Thomson-CSF Visualisation et Traitement des Informations T-VT Paris, France
[32] Priority Mar. 14, 1968
[33] France
[31] 143780

[54] INFRARED IMAGE CONVERSION APPARATUS
16 Claims, 9 Drawing Figs.

[52] U.S. Cl. 178/6.8, 178/DIG. 27, 178/7.6, 250/235, 250/236, 350/6, 350/285
[51] Int. Cl. H04n 3/08, H04n 5/30
[50] Field of Search 178/7.6, DIG. 27, 6.8; 350/6, 7, 285; 250/235, 236

[56] References Cited

UNITED STATES PATENTS

| | | | |
|---|---|---|---|
| 1,802,802 | 4/1931 | Best | 178/7.6 |
| | 961 | Scanlon | 178/7.6 |
| | 961 | Gramm | 350/7 |
| | 967 | Treseder | 178/7.6 |
| | 3/1968 | Wurz | 178/7.6 |
| 3,444,386 | 5/1969 | Diamant | 350/7 |
| 3,447,852 | 6/1969 | Barlow | 350/7 |
| 3,532,037 | 10/1970 | Auphan | 350/7 |

*Primary Examiner*—Robert L. Richardson
*Assistant Examiner*—Joseph A. Orsino, Jr.
*Attorney*—Stephen H. Frishauf

ABSTRACT: A point-type radiation detector, located in a cryogenic surrounding provides output signals. Mechanical optical scanning of the image is obtained by an oscillating mirror focused on a projection plane, in which also the IR detector is located, and oscillating over an angle 2*θ*, from which plane a radiation collection means in the form of a plane-convex lens system projects the IR radiation on a rotating mirror, so that the image is scanned in a sequential cycloidal pattern, the rotating mirror rotating about an axis angled with respect to the central axis of IR detector and the oscillating mirror. Output signals are obtained from the IR detector, reflection signals from the scanning mechanism for both mirrors and all signals applied to a cathode-ray tube for reproduction of the image, as scanned.

3632868
OR CLASSIF

JEAN PAUL GAFFARD,
YVES GLANGEAUD, &
JOSÉ SUPPO,
Inventors
by Flynn + Frishauf Atty's

INFRARED IMAGE CONVERSION APPARATUS

The present invention relates to image conversion apparatus, converting infrared images to signals which can be reproduced on a television-type tube screen, and more specifically to such apparatus which can operate at high-frame repetition rate for continuous observation of movable objects. The invention is particularly applicable to observation of objects emitting infrared (IR) radiation in the band width of from 3 to 5 microns.

Various types of television-type scanning infrared detection cameras have been proposed; according to one system, the detector and optical arrangement is moved together. This system presented difficulties and disadvantages, particularly since apparatus of substantial mass must be moved since the IR detector must be cooled to cryogenic temperatures. It has therefore been proposed to leave the detector in a fixed position and analyze the object only by scanning with optical means. Such optical means may be movable mirrors, or prisms which rotate about a given axis. The simplest of such systems utilize a movable mirror, suspended in a gimbal, movable about two perpendicular axes. The movements are, however, not continuous and rapid scanning, and thus analysis of the object to be imaged, is difficult. Rotatable prisms, such prism systems known as diasporameters, permit slow and rapid scanning; depending upon the relative speeds of rotation of a pair of prisms, the field is scanned in an epicycloidal, diametrical, or spiral pattern. Similar scanning patterns may be obtained by rotating mirror systems, thus improving resolution and sharpness of the image. The objective, associated with the detector, may be of the Newton type in order to eliminate a central blind spot.

Apparatus for infrared detection have recently been used for various medical applications, requiring additional sensitivity, sharpness and definition of image, and speed of observation. Reference may be had to Volume 48, Nos. 1 and 2 of the Jan.-Feb. 1967 issue of "Journal de Radiologie d'Electrologie et de Medecine Nucleaire." The apparatus there described utilizes optical-mechanical scanning to obtain a linear breakup of the image within a scanning field.

Infrared detection apparatus is also needed in industrial fields, for example to check on uniformity of temperatures, or even the temperature value by comparison with a reference source, supervision of movement of equipment, control of electrical, or electronic circuits and the like; and, for example, detection of abnormal temperatures in general. In biology, botany, as well as in medicine, infrared images are often needed. Thermographic charts may aid in the detection of sources of infection, or superficial tumors by a very quick examination. Additional uses are in agriculture, and the meteorological field.

It is an object of the present invention to provide an IR image reproduction apparatus which is simple, is capable of rapid scanning by optical-mechanical means and provides a sharp image of high resolution, while utilizing standard readily available equipment.

SUBJECT MATTER OF THE PRESENT INVENTION

Briefly, a pair of mirrors are provided, one of which is oscillating, and the other of which turns about an axis inclined about the optical-mechanical axis of the oscillating mirror. A lens system is provided between the oscillating and the rotating mirror, the rotating mirror being responsive to the image collected on the lens system, so that the image of an object is scanned over a cycloidal field. The relative speeds of oscillation and rotation permit high-repetition rate, and very fine resolution. The speeds need not be synchronous, and asynchronous operation improves the quality of the reproduced image. The image from the rotating mirror is projected on a point-type IR detector, which is fixed (and thus can be readily cooled to cryogenic temperatures), the IR detector providing control signals to a cathode ray tube, which is scanned in synchronism with the physical movement of the oscillating and rotating mirrors.

The invention will be described by way of example with reference to the accompanying drawings, wherein.

Figure 1:
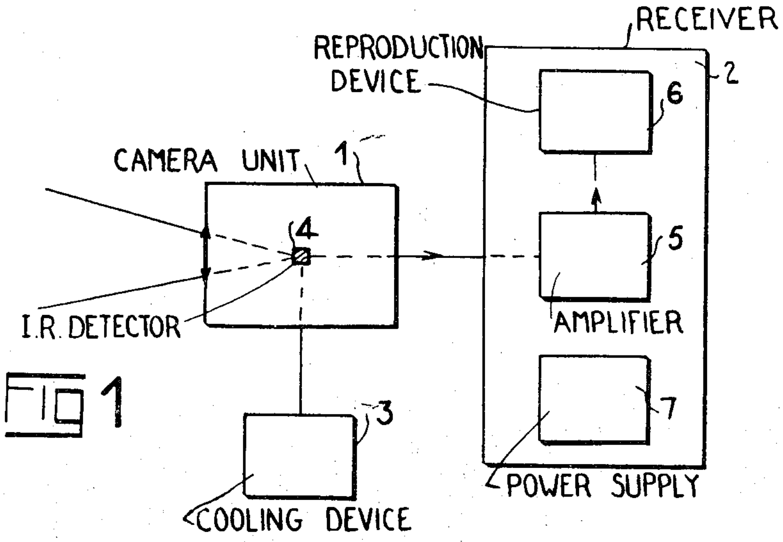
FIG. 1 is a general block diagram of the equipment.

A camera unit 1 is connected to a reproducing apparatus 2. A cooling device 3 controls distribution of cooling fluid to an infrared (IR) detector 4 within camera 1. Camera 1 includes optical-mechanical scanning apparatus and the output of the camera is applied to reception unit 2, for amplification of detected signals and for conversion of scanning signals to the type of scanning signals demanded by a display cathode ray tube. Receiver 2 thus includes an amplifier 5 to amplify received signals, and convert the signals for utilization by an image reproduction device 6. A power supply, schematically indicated at 7, provides operating power and synchronizing signals. The optical output appears on the face of a cathode ray tube which forms a part of the reproducer 6.

Figure 2:
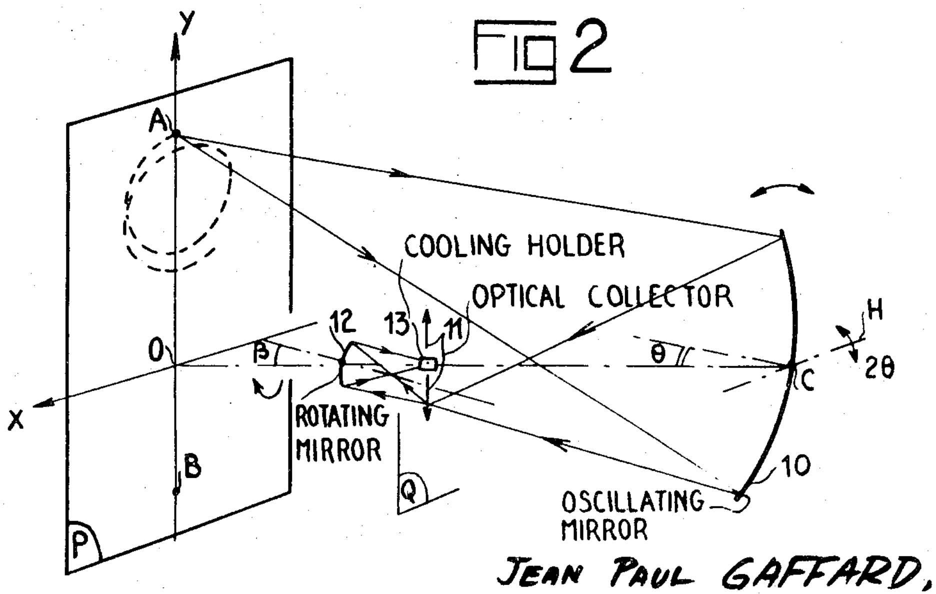
FIG. 2 is a diagrammatic view of the optics of the equipment, and illustrating optical paths.
Figure 3:
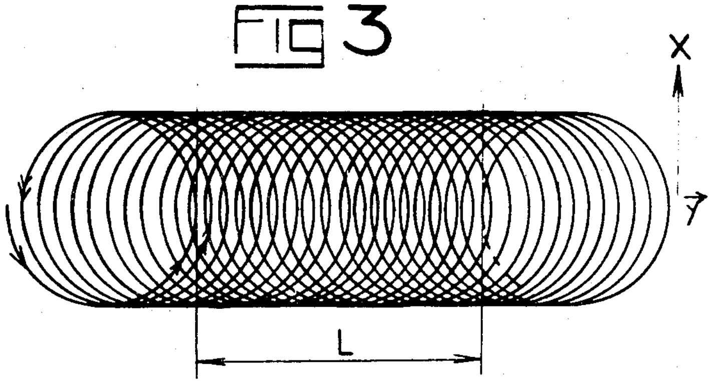
FIG. 3 is a schematic representation of a cycloidal scanning pattern.
Figure 4:
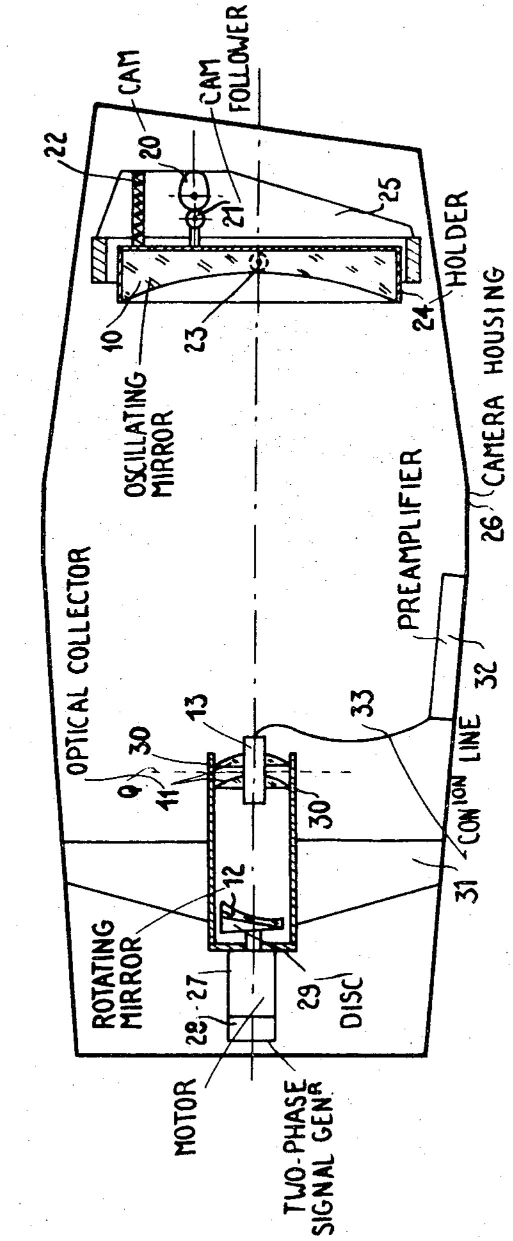
FIG. 4 is a schematic presentation of an operative IR detection apparatus in accordance with the present invention.

The camera unit 1 is illustrated in greater detail in FIGS. 2 and 4, the scanning path being indicated in FIG. 3. The optical system, as best seen in FIG. 2, essentially includes a primary oscillating mirror 10, an optical collector element, or system 11, and a secondary, or rotating mirror 12.

The primary mirror 10 may be a parabolic mirror, of the Fresnel, or Mangin type. If the primary mirror 10 is parabolic, or of the Fresnel type, then it may be formed of a thin polished metal sheet. A glass surface, optically polished and treated may also be used. The mirror 10 is rotatable about a fixed horizontal axis H, perpendicular to its optical axis, and passing through the central part C. Mirror 10 is mechanically secured in a holder, not shown in FIG. 2, which provides for angular displacement over an angle $\theta$on either side from the central axis, so that the maximum excursion of the mirror will be over an angle 2 $\theta$, the mirror oscillating back and forth between its two limiting positions. Movement of the primary mirror provides for vertical scanning, and projects on a projection plane Q an image of the field observed from the object to be scanned, located in a plane P, having a height A–B along a vertical axis Y. Planes P and Q are considered perpendicular to the optical axis of the primary mirror 10 considered in the median position about which it oscillates with a maximum angular excursion equal to $\theta$ on both sides. It may also be considered that any plane such as plane P located in the focusing range of the camera unit 1 is projected by the primary mirror 11 on the plane Q (see FIG. 1). The mirror scans vertically from A to B and then back from B to A in succession.

Located in, or close to the projection plane Q is an optical collection or reception device 11. It may, in a simple form, merely consist of a pair of plane-convex lenses, or may be more complex, for example forming an Abbe system. The collection device must be transparent to the infrared radiation to be detected within the spectral bands under consideration. Collector 11 has a central opening large enough to accept the placement of the IR detector within a cryostatic cooling holder 13.

The secondary, or rotating mirror 12 is preferably of the toroidal type and may be made of glass or of metal. It is held by apparatus, not shown in FIG. 2, and rotates about an axis 0–C at a constant angular speed. The axis of rotation of mirror 12 is identical to the axis 0–C of the collector-IR detector assembly and to the optical axis of the primary mirror considered in its median position. The optical axis, however, of the mirror is inclined by several degrees with respect to the axis of rotation, as indicated by the angle $\beta$. Means may be provided to adjust the inclination $\beta$ and thereby the width of the scanned field. The curvature of mirror 12 is so determined that any point of the image, received on plane Q, is projected on the IR detector, the image on the plane Q being projected thereon by the primary mirror 10. Rotation of secondary mirror 12 thus successively scans in a circular path the intermediate plane Q and projects the scanned image on the IR detector. The diameter of this scanned ring depends on the angle $\beta$ of the secondary mirror 12 with respect to its axis of rotation, and determines the width of the field which is scanned along the X-axis on plane P. As can be seen, and as illustrated in FIG. 3, the joint movement of the two mirrors produces a scanning field of cycloidal aspect considered on a plane P in the focusing range. This particular cycloidal pattern result of a vertical scanning rate notably slow relatively to the circular scanning rate in manner to provide a high-scanning resolution in said field.

The optical scanning of the elements projects images from a plane P, point by point. The camera thus views objects in plane P. The distance between the camera and plane P may be several meters. Rotation of mirror 12 results in a circular exploration of the scanned field, which is much more rapid than the alternate oscillatory movement of mirror 10, corresponding to the vertical displacement of amplitude A–B. These two movements may be asynchronous with respect to each other; interlace of the scanned zones may be readily obtained, so as to cover the entire field with the definition desired. The length L, illustrated in FIG. 3, is representative of the length of the scanned field which is completely resolved.

FIG. 4 illustrates, by way of example, an entire camera assembly built in accordance with the present invention. The oscillatory movement of mirror 10 is obtained by a cam 20, rotated by a motor (not shown) at uniform speed. Cam 20 may have the shape of a cardioide, which result in a constant angular speed of the mirror. Movement to the mirror is transmitted by means of a cam follower 21; a spring 22 holds cam and cam follower in contact. Mirror 12 itself is supported by trunnions 23, secured to a mirror holder 24, and journaled in a frame 25 secured by means, not shown, to the camera housing 26.

The secondary, or rotating mirror 12 is rotated by a motor 27, which may be synchronous or asynchronous, and the shaft of which is further connected to a two-phase signal generator 28. Signal generator 28, in form of an AC generator, delivers two sinusoidal signals, in quadrature with respect to each other. These quadrature signals provide reference signals indicative of instantaneous position of the mirror. They are utilized in electronic circuits, to be explained below, in connection with the scanning of the tube. A constant inclination of angle $\beta$ of the optical axis of the mirror, is readily obtained by mounting the mirror 12 on a disc which is wedge shaped in cross section, as seen at 29. The entire assembly, motor, signal generator, holder 29 and secondary mirror 12, as well as the image collector 11 and the cryostat together with the IR detector is held in a mechanical support 30, secured by thin wings 31 to the camera body 26.

Focusing is accomplished by relative displacement along the axis 0–C of the primary mirror 10 to the secondary mirror 12. This may be done by displacement along this axis, either of the assembly including mirror 12, collecting lens 11 and detector 12, or of the primary mirror 11. For example, primary mirror 10 may be displaced parallel to the optical axis of the collector. For such displacements, the support 25 may be mounted to be longitudinally movable within the tube 26, either manually, or automatically or by means of a servo motor. The image plane P can thus be focused on plane Q, and a focusing range of from about one meter to infinity from the surface of mirror 10 can be obtained. The camera body 26 itself can be supported on any suitable means, such as a tripod (not shown) or any other well-known device.

A preamplifier 32 is preferably enclosed within the tube 26, and connected by a connection line 33 with the IR detector element itself. Preamplifier 32 is not part of the optical-mechanical assembly, but is preferably located close to the detector in order to shorten connections from the IR detector and to provide sufficient preamplification for remote signal processing.

Figure 5:
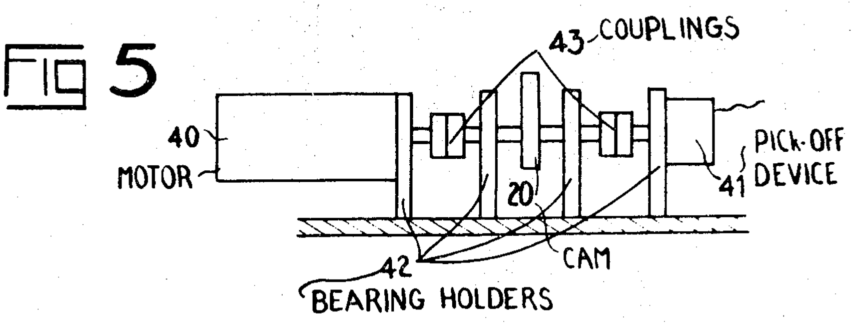
FIG. 5 is a schematic view of a mechanical deflection drive for the principal mirror.

FIG. 5 illustrates one embodiment of oscillating mirror 10. A drive motor 40, which preferably is an asynchronous motor with an intermediate speed reduction gearing, drive cam 20. A position signal generator 41 is likewise connected to the output shaft from motor 40 and provides output signals having a characteristic which gives information of the instantaneous angular position of the principal mirror 10. The pickoff device 41 may be, for example, a potentiometer, a square wave pulse generator supplying pulses synchronous with the rotation and applied to an integrator, or any other well-known position analog signal output device. The entire assembly is supported by bearing holders 42, and interconnected by means of couplings 43.

Figure 6:
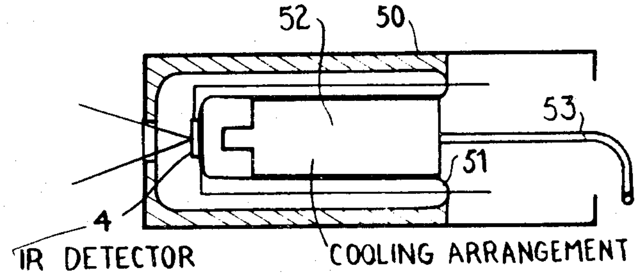
FIG. 6 is a schematic view, partly in section, of the IR detector, and its associated cooling system.

IR detector 4 is contained within an assembly 13, and seen in greater detail, schematically, in FIG. 6. IR detector 4 is a solid state semiconductor, photosensitive element, with a sensitivity to IR radiation in the band to be examined. It is placed within the cavity of a hollow element 51, such as a Dewar vessel, which provides at the same time thermal as well as electrical insulation. IR detector 4 is exteriorally connected by means of wires, twisted, or coaxial cables or the like. Cooling arrangement 52 may provide for transfer of liquified gas or, preferably, may include a single, double or triple stage evaporator. Other solutions to cool the solid state IR detector element utilize Peltier effect devices. Any combination of various known cooling arrangements may also be used. The example illustrated in FIG. 6 shows a cooling device 52, formed as a Joule-Thomson evaporator which, in its simplest form, is a single stage, receiving over a tubing 53 a compressed gas, for example, nitrogen, argon, air or the like. The entire assembly is enclosed within a housing 50 which serves both as an electric as well as magnetic shield and as a protection of IR detector cell 4. Shield 50 is formed with an opening for the passage of IR radiation. The cross-hatched zone in FIG. 6 is preferably filled with a material additionally providing electrical and thermal insulation between shell 50 and Dewar 51.

Figure 7:
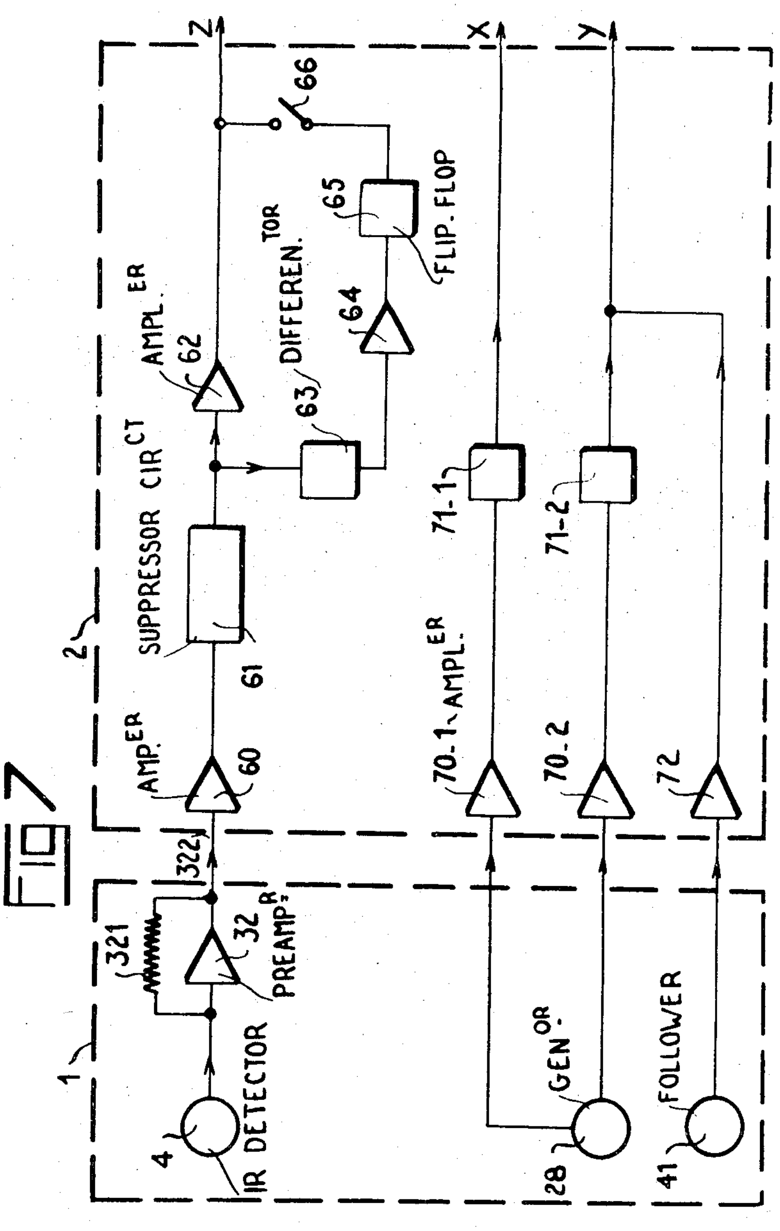
FIG. 7 is a schematic electrical circuit for the reproduction apparatus.

The electronic circuitry within receiver 2, as well as the cooling gas supply 3 is usually remote from the camera. Referring to FIG. 7, a first channel conducts signals for IR detector 4 to preamplifier 32 (previously seen mounted within the camera in FIG. 4). The preamplifier may have a differential input and connected to automatically compensate for temperature variations departing from an average means, due to temperature changes within IR detector 4. It may, if desired, include a feedback circuit 321 for gain stabilization. The output from preamplifier 31, appearing on line 322 is applied over an output cable from the camera to an amplifier 60, of high gain in order to provide an output level sufficient to be applied to a noise suppressor circuit 61. The noise level of the signal from amplifier 60 must be sufficiently low so that the signal can readily be separated from background. Information theory and "autocorrelation" signal processing, now well known in the art, may be utilized and circuitry including matched filters may be included within circuit 61 to separate the desired signal from background noise. Circuit 61 may also include a delay line, followed by an integrator, output being applied to an output amplifier 62, preferably of the impedance matching type, for connection to an output line Z to control the grid circuit of a cathode ray tube (CRT). A silhouetting, or outline circuit can be selectively connected, which includes a differentiator 63, a threshold detector 64 and a flip-flop 65, all connected in series with a switch 66. When switch 66 is closed, contour-lines of the radiating objects located in the scanned field will appear more luminous on the image reproduced on the CRT. Flip-flop 65 is of the monostable type.

In addition to the signal output channel from IR detector 4, the electronics further includes X and Y scanning signal channels for the CRT. Generator 28 provides a pair of output signals, phase shifted with respect to each other by 90 electrical degrees. These signals are applied to amplifiers 70–1 and 70–2 and transmitted over phase adjustment circuits 71–1 and 71–2 to outputs X, Y. Vertical and horizontal deflection signals, corresponding to the movement of the secondary mirror 11, are thus provided to the CRT and enable circular scanning. The vertical displacement of the circular scan, due to movement of the principal mirror 10, is obtained from a reference signal derived from the follower element 41 (FIG. 5) and likewise applied to the Y output over an adjustable gain amplifier 72. The details of these circuits need not be shown since they are well known in the art; likewise, the mixing stages to connect the output from element 41 go the Y output is not further illustrated since it, also, is well known.

Figure 8:
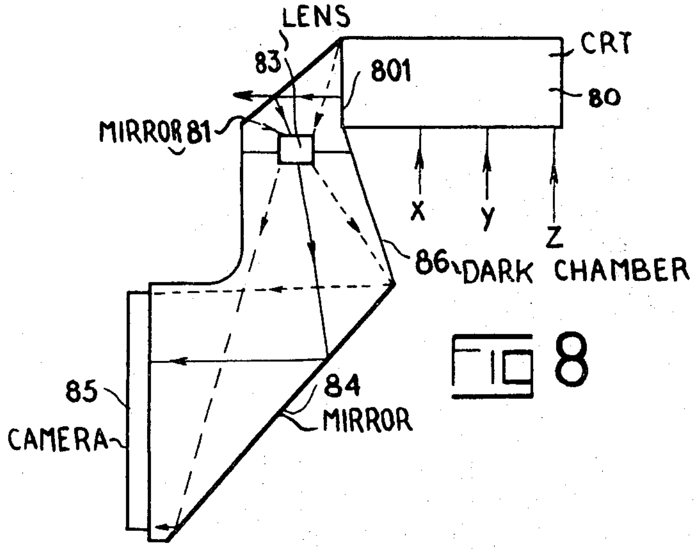
FIG. 8 is a schematic representation of the image viewing apparatus.

Reproduction and observation of the output from the CRT is illustrated in FIG. 8, in schematic form. CRT 80 has signals X, Y, Z applied thereto. The image will appear on the CRT screen 801. The persistence of the screen is so selected that the observer will have continuity of vision, without smear, of successive scans even if the object observed moves, or the camera is displaced. The image appearing on the CRT screen conforms to the field scanned by the IR camera 1, the contrasts appearing on the screen corresponding to the local temperature variations or the intensity of emitted heat of the objects scanned by the camera. Increase of temperature will provide an increase in brightness of a spot on the screen 801. Likewise, elements at even temperature but having an increased heat emission will provide corresponding visible variations in luminous intensity on the screen itself. The CRT may be directly viewed, or may be photographed. A simple arrangement is illustrated in FIG. 8. A separating mirror 81 is located in light-receiving relation to the screen 801 of CRT 80. Mirror 81 is so arranged that it passes radiation of a certain wave length, but reflects radiation of another wave length. Mirror 81 thus permits passage of radiation from screen 801 in the yellow, orange and red bands, which correspond to the remanent portion of the image on the screen, while reflecting radiation in the wave length between yellow and purple. In addition to acting as a separator, the mirror also suppresses the blue components for the observer, which usually do not have remanence on the screen; this does not interfere with general viewing, but rather enhances the "warm" image received from the object viewed by the camera. The blue components of radiation from screen 801 are transmitted over a lens schematically shown at 83 and a reflecting mirror 84 to a photographic apparatus 85. The entire viewing arrangement is contained within a dark chamber 86. Film can readily be made to be most sensitive to the spectrum reflected by mirror 81. Lens 83 preferably has a large opening and is associated with a manual, or automatic or servo controlled shutter so that the exposure time in camera 81 can be arranged so that a sequence of exposures, say 10 to 20 successive exposures can be made. Combined with desynchronization between the scanned image lines, sharp lines are somewhat softened and contrasts are less harsh. Mirror 84 is not absolutely necessary but enables reduction of the size of the photographic black chamber 86 while improving accessibility of camera 85. The distance between camera and screen 801 can also be made variable so that the size of the image projected on the photographic film may be arranged to provide for a one-to-one relationship between objects only a small distance from the camera, for example up to 7 meters.

Figure 9:
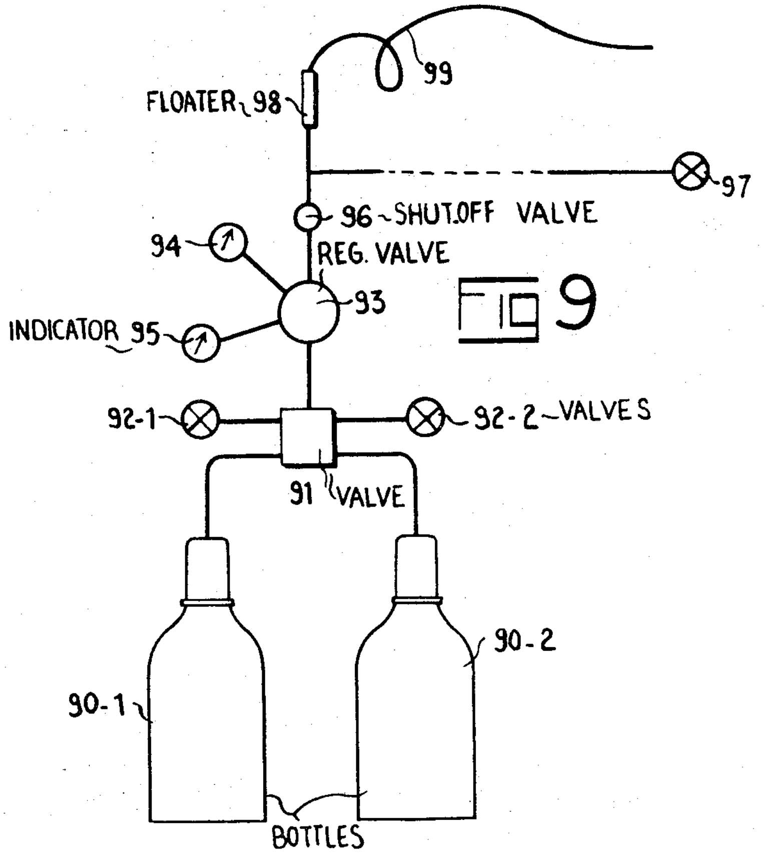
FIG. 9 is a schematic illustration of a cooling fluid supply, for connection to the IR detector of FIG. 6.

The cryogenic cooling fluid supply or control arrangement is schematically illustrated in FIG. 9. Two gas bottles 90–1, 90–2 of commercial manufacture, and containing argon, nitrogen, air or the like under high pressure, are connected by piping to a change over valve 91 which enables utilization of one bottle while the other is in reserve, and switch over as one bottle becomes empty without interruption of fluid flow. A pair of safety valves 92–1, 92–2 are connected to each one of the lines from the bottles, and further are arranged to indicate low pressure and the necessity for changeover. A regulating valve 93 is provided to regulate the output pressure, upstream pressure being readable on an indicator 95, and downstream pressure on an indicator 94. A shutoff valve 96, preferably manually controlled, connects from pressure regulator 93 to a filter 98, which may be of the molecular type, and then to a line 99 for connection with line 53 (FIG. 6). Filter 98, which may be of commercial manufacture, is designed to trap water, carbon anhydrides, traces of oil, and any solids which might interfere with proper operation of the cryogenic cooling device within the camera. The pressure indicator 97 may be connected, as shown.

Rather than utilizing a pair of compressed gas supply bottles, a compressor and a filter can be used, the compressor utilizing ordinary ambient air and delivering the air, compressed and precooled to a sufficiently high pressure; various other modifications are possible, for example a subsequent compressor may be utilized to supply precompressed gas taken from one stage of the cryostat to the second stage, or to operate with gas supply bottles in a closed circuit. Also, a Sterling cycle system may be arranged, placed directly within the camera. Liquified gas may also be stocked and transmitted to the IR detector by means of appropriate transfer devices in which the phase of the liquids change, that is in which liquids are supplied to the IR detector, to be changed there into gas. Gases may also be trapped in pulverized material, or the gas may be compressed to form droplets within an entrapment material to then form a gas current. Pelter devices, and operating in cascade, electrically, may also be used to cool the IR detector. Any combination of such systems may be used.

If it is necessary to obtain very low temperatures, a double or triple stage cooling system may be used, for example by providing a first compressed gas which liquifies at a comparatively high temperature to precool a second gaseous fluid, having a lower liquification temperature, and thus assisting in its liquification. The last fluid in a group, which will be the coldest, is then used to actually cool the IR detector. The first stage may be an ordinary commercial freezing arrangement, utilizing commercially available refrigeration fluids, for example Freon a polytetrafluorethylene.

The present invention thus provides a scanning-type IR viewing system, providing output signals which can be displayed on a CRT. Various modifications and changes may be made. More than one IR detector cell may be used, located for example side by side, and having their sensitized surfaces electrically insulated from each other. The signals delivered by each of these cells are then transmitted by separate signal processing channels. Direct amplification, detection with synchronism or asynchronous, by frequency or phase modulation or amplitude modulation, digital techniques or other signal processing techniques may be utilized. One of the primary advantages of the system of the present invention is the simplicity of the arrangement, and particularly the optical-mechanical scanning while still providing high resolution and high-image repetition rate without requiring synchronization of scanning in a horizontal and vertical direction for separately synchronized equipment. Photographs, of large scale may be made, for example on the formate of 30×40 centimeters, thus enabling true-to-size reproductions of objects situated one to several meters from the camera. By utilizing the circuit containing elements 63, 64, 65, 66 (FIG. 7) silhouettes or outlines only may displayed.

The camera of the present invention can readily be made to be sensitive to the spectral region of four microns, with a range of from three to five microns, without difficulty. Infrared television images may thus be obtained directly from bodies which emit infrared radiation, either due to their self-radiation, or being subject to infrared radiation itself. The electronic circuitry is simple and can be made in the form of integrated circuits, thus enabling use of the apparatus in medical, biological, and scientific equipment.

We claim:

1. Infrared image conversion apparatus comprising infrared radiation detector means and means scanning the image and projecting radiation derived from the scanned image onto the detector means optical-mechanical scanning means including a primary mirror (10) oscillating about an axis (H) perpendicular to its optical axis with a predetermined angular excursion 2 $\theta$) and projecting the image of any radiating point located in the field observed on a projection plane (Q) perpendicular to the direction (O–C) of said optical axis in its median position;

optical collecting means (11) located substantially in said plane and optically centered along said direction and formed with an opening in said central optical axis and located in said project plane (Q);

an infrared radiation detector (4) located in the opening of said collection means, the infrared radiation detector (4) being sensitive to radiation which reaches it along a predetermined path;

cooling means (3) located close to said detector;

a secondary mirror (12) rotating about an axis congruent with said direction and optically tilted by a constant angle ($\beta$) with respect to said rotating axis, said secondary mirror focusing on said rotating axis, said secondary mirror focusing on said infrared radiation detector, at any instant the radiation received from a radiating point in said field through said oscillating mirror and said collecting means, said primary mirror (10) providing a linear scanning pattern and said secondary mirror (12) providing simultaneously, at a higher speed, a circular scanning pattern so as to scan the observed field with a sequential cycloidal-type scanning pattern and project the infrared radiation of said image, point by point, on said radiation detector (4);

and means deriving reference signals indicative of the instantaneous position of said mirrors and thus of any specific point on the scanned field.

2. Apparatus according to claim 1 wherein said oscillating mirror (10) is a parabolic mirror.

3. Apparatus according to claim 1 wherein the relative spacing of the oscillating mirror (10), the rotatable mirror (12) and the optical collecting means (11) is adjustable.

4. Apparatus according to claim 1 wherein said optical collecting means (11) comprises at least one plane-convex objective (FIG. 4, 11).

5. Apparatus according to claim 1 wherein the rotating mirror (12) is a toroidal mirror.

6. Apparatus according to claim 1 wherein said rotatable mirror (12) is coupled to a two-phase signal generator providing a pair of reference signals representative of instantaneous mirror position in quadrature phase.

7. Apparatus according to claim 1 wherein the angle of tilt ($\beta$) of the optical axis of the rotatable mirror with respect to the central axis is adjustable, whereby the width of the scanned field is adjustable.

8. Apparatus according to claim 1 wherein said cooling means (3) is located in the central opening of the optical collecting means (11).

9. Apparatus according to claim 1 wherein the speed of movement of said mirrors is asynchronous and the relative speeds determine the resolution of scanning the image.

10. Apparatus according to claim 1, wherein the central axis (H) of the oscillating mirror and the central optical axis of the optical collecting means (11) are congruent.

11. Apparatus according to claim 1, wherein the oscillating mirror (10) is a parabolic mirror, the rotating mirror is a toroidal mirror (12) and the optical collecting means (11) comprises at least one plane-convex objective (FIG. 4: 11).

12. Apparatus according to claim 1 including means oscillating said oscillating mirror (10) comprising a motor (40), a cam and cam-follower (20) combination driven by said motor and engaged by said mirror;

and signal generating means providing a reference signal representative of angular position of said mirror as determined by its cam position.

13. Apparatus according to claim 12 wherein said signal generator comprises a potentiometer coupled to said cam and positioned in synchronism therewith, said cam having a cardioide shape.

14. Apparatus according to claim 12, including video circuits connected to have signals from said infrared radiation detector (4) applied thereto;

and a cathode ray tube (FIG. 8: 80) having its cathode ray scan controlled by the reference signals and the intensity of its beam controlled by the output signals from the video circuits.

15. Apparatus according to claim 14 including a chromatic separating filter and mirror (81) located to view the screen of said cathode ray tube and having a transmissibility in the yellow-red range and reflectivity in the green-blue range;

observation means permitting observation of the screen of the cathode ray tube through said filter-mirror acting as a filter, and photographic means located to be exposed to the image of the cathode ray tube as reflected by said separating filter-mirror acting as a mirror.

16. Apparatus according to claim 14 including an autocorrelation network selectively connectable to the output of the infrared detector circuit, said network comprising the series connection of a differentiator (63), a threshhold detector (64) and a monostable flip-flop circuit (65), whereby the outline of the scanned image will be reproduced on the screen of the cathode ray tube.

* * * * *